(12) United States Patent
Deshpande et al.

(10) Patent No.: US 10,121,168 B2
(45) Date of Patent: *Nov. 6, 2018

(54) CUSTOMER PURCHASING PREFERENCE PROFILES BASED ON COUPON CHOICES

(71) Applicant: International Business Machines Corporation, Armonk, NY (US)

(72) Inventors: Ajay A. Deshpande, White Plains, NY (US); Kimberly D. Hendrix, New Albany, OH (US); Herbert S. McFaddin, Yorktown Heights, NY (US); Chandrasekhar Narayanaswami, Wilton, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 447 days.

This patent is subject to a terminal disclaimer.

(21) Appl. No.: 14/745,707

(22) Filed: Jun. 22, 2015

(65) Prior Publication Data

US 2015/0294369 A1   Oct. 15, 2015

Related U.S. Application Data

(63) Continuation of application No. 14/540,643, filed on Nov. 13, 2014.

(60) Provisional application No. 61/897,950, filed on Oct. 31, 2013.

(51) Int. Cl.
*G06Q 30/02* (2012.01)

(52) U.S. Cl.
CPC ..... *G06Q 30/0269* (2013.01); *G06Q 30/0201* (2013.01); *G06Q 30/0224* (2013.01); *G06Q 30/0226* (2013.01); *G06Q 30/0257* (2013.01)

(58) Field of Classification Search
CPC ....................................................... G06Q 30/02
See application file for complete search history.

(56) References Cited

U.S. PATENT DOCUMENTS

| | | | | |
|---|---|---|---|---|
| 4,817,990 A | * | 4/1989 | Krost ...................... | A63F 3/069 283/101 |
| 2007/0203791 A1 | * | 8/2007 | Kohl ...................... | G06Q 30/02 705/14.25 |

(Continued)

OTHER PUBLICATIONS

List of IBM Patents or Patent Applications Treated As Related—Date Filed: Jul. 16, 2015; 1 page.

(Continued)

*Primary Examiner* — Vincent M Cao
(74) *Attorney, Agent, or Firm* — Cantor Colburn LLP (57) ABSTRACT

According to an aspect, a method for creating or improving customer preference profiles includes providing a decision coupon to a customer with two or more promotional options directed to related items selected to ascertain a purchasing preference associated with the related items through selection of one of the promotional options. A selection of one of the promotional options is received and an indication of the selected promotional option is stored in a purchasing preference profile for the customer. The indication of the selected option is used to update an affinity for a product or product category for the customer within the customer's purchasing preference profile.

4 Claims, 9 Drawing Sheets

(56) References Cited

U.S. PATENT DOCUMENTS

| | | | | |
|---|---|---|---|---|
| 2008/0015938 | A1* | 1/2008 | Haddad | G06Q 20/387 705/14.38 |
| 2008/0059297 | A1* | 3/2008 | Vallier | G06Q 30/02 705/14.27 |
| 2012/0066049 | A1* | 3/2012 | Muthugopalakrishnan | G06Q 20/387 705/14.26 |
| 2013/0073377 | A1* | 3/2013 | Heath | G06Q 30/02 705/14.39 |

OTHER PUBLICATIONS

Ajay A. Deshpande, "Customer Purchasing Preference Profiles Based on Coupon Choices" U.S. Appl. No. 14/510,643, filed Oct. 9, 2014.
Ajay A. Deshpande, "Pop-Up Store Logistics Management System" U.S. Appl. No. 14/745,670, filed Jun. 22, 2015.
Ajay A. Deshpande, et al; U.S. Appl. No. 14/510,636; "Logistics Management System for Determining Pickup Routesfor Retail Stores"; filed Oct. 9, 2014.
Ajay A. Deshpande, "Logistics Management System for Determining Pickup Routes for Retail Stores" U.S. Appl. No. 14/745,687, filed Jun. 22, 2015.
Ajay A. Deshpande, "Partner Marketing and Order Fulfillment Based on Partner Merchant Shipping Efficiencies" U.S. Appl. No. 14/742,758, filed Jun. 18, 2015.
Ajay A. Deshpande, "Partner Marketing and Order Fulfillment Based on Partner Merchant Shipping Efficiencies" U.S. Appl. No. 14/529,909, filed Oct. 31, 2014.
Ajay A. Deshpande, "Partner Marketing Based on an Expected Customer Visit" U.S. Appl. No. 14/742,763, filed Jun. 18, 2015.
Ajay A. Deshpande, "Partner Marketing Based on an Expected Customer Visit" U.S. Appl. No. 14/529,925, filed Oct. 31, 2014.
Ajay A. Deshpande, "Development of Dynamic Business Data for Marketing to Moving Spatiotemporal Phenomena and Events" U.S. Appl. No. 14/742,870, filed Jun. 18, 2015.
Ajay A. Deshpande, "Development of Dynamic Business Data for Marketing to Moving Spatiotemporal Phenomena and Events" U.S. Appl. No. 14/529,936, filed Oct. 31, 2014.
Ajay A. Deshpande, "Pop-Up Store Logistics Management System" U.S. Appl. No. 14/510,632, filed Oct. 9, 2014.

\* cited by examiner

| | |
|---|---|
| CUSTOMER LOYALTY ACCOUNT - GEORGE P. BURDELL | 51 |
| CUSTOMER CONTACT INFORMATION | 52 |
| CUSTOMER ADDRESS INFORMATION | 53 |
| CUSTOMER PREFERENCE INFORMATION | 54 |
|    CUSTOMER HAS AFFINITY FOR VEGETARIAN OVER MEAT ITEMS | 55a |
|    CUSTOMER HAS AFFINITY FOR ORGANIC VEGETABLES | 55b |
|    CUSTOMER HAS AFFINITY FOR DRINKS OVER FOOD ITEMS | 55c |
|    ⋮ | |
| CUSTOMER COUPON UTILIZATION | 56 |
|    COUPON NO. XXX     DATE: YYY | |
|    ⋮ | |
| CUSTOMER SHOPPING HISTORY | 58 |
|    ITEM NO. XXX     LAST PURCHASE DATE: YYY   FREQUENCY: ZZZ | |
|    ⋮ | |

CUSTOMER PURCHASING PREFERENCE PROFILES BASED ON COUPON CHOICES

DOMESTIC PRIORITY

The present application Ser. No. 14/510,643 filed on Oct. 9, 2014 titled "CUSTOMER PURCHASING PREFERENCE PROFILES BASED ON COUPON CHOICES" is a nonprovisional of and claims priority from U.S. Patent Application Ser. No. 61/897,950, filed on Oct. 31, 2013, entitled "SYSTEM AND METHOD FOR FLIP COUPONS", the entire contents of which are incorporated herein by reference.

BACKGROUND

The present disclosure relates generally to advertising systems, and more specifically pertains to gathering or updating customer profile preferences by presenting a plethora of coupon selection choices and then using the gathered profiles to enable targeted, relevant, and/or personalized advertising.

Retailers have developed customer loyalty programs that allow customer profiles to be created for repeat customers. Customer profiles can include a wealth of information about the customer, including demographics, income levels, spending patterns, and purchasing preferences. Customer profiles are increasingly being recognized as key assets for retailers, as they are key elements in constructing targeted advertising campaigns and other forms of customer engagements, and also affect store merchandising plans and operations. Many retailers also offer coupons to customers. Although traditional coupon systems are considered effective in generating customer loyalty for the coupon clippers, they are largely underutilized as an information source for improving customer profiles. Improved customer profiles can lead to improved targeted advertising, yielding a more effective marketing tool, improving the ability to reach the right customers in a manner that they are willing to receive. Many prospective customers block unsolicited email and summarily discard what they consider to be junk mail. Retailers are therefore searching for ways to improve customer loyalty and targeting advertising programs though improved customer profiles.

SUMMARY

Embodiments include a method, system, and computer program product for creating or improving customer preference profiles based on coupon choices. A method for creating or improving customer preference profiles includes providing a decision coupon to a customer with two or more promotional options directed to related items selected to ascertain a purchasing preference associated with the related items through selection of one of the promotional options. A selection of one of the promotional options is received and an indication of the selected promotional option is stored in a purchasing preference profile for the customer. The indication of the selected option is used to update an affinity for a product or product category for the customer within the customer's purchasing preference profile.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein relate to targeted advertising using customer purchasing preference profiles based on coupon choices. Decision coupons are offered to customers allowing them to choose between promotional options. The selected coupon choices are recorded in the customer's loyalty account, which typically has an associated loyalty card (also known as an "affinity card") scanned at checkout time. The coupon selections are stored in association with the customer's loyalty account to indicate the customer's affinity for the product promoted in the selected coupon. Coupon expirations dates are checked and valid coupons for the selected promotion may also be automatically applied at checkout time to eliminate the need for clipping or printing paper coupons. The customer's coupon choices along with coupon redemption and product purchasing history are used to build a customer purchasing preference profile, which is stored in association with the customer's loyalty account to indicate the customer's affinity for the product promoted in the selected coupon. Targeted advertising including promotional information, discounts and coupons are directed to the customer based on the customer's preference profile.

With customer opt-in authorization, which may be received when the customer downloads a mobile app for their customer loyalty program, the customer receives in-store targeted advertisements including promotional information, discounts and coupons upon detection of the customer's presence in the store. The customer may also authorize the host store operator to share the customer's preference profile with other program affiliates, such as product manufacturers and marketers for the purpose of sending in-store or out-of-store targeted advertisement to the participant. In-store discounts and coupons accepted by program participants are credited to their loyalty accounts and unexpired coupons are applied automatically at checkout without the customer having to take further action to redeem the selected promotions. The system thus handles discounts and coupons with expiration dates, as well as those without expirations dates. Out-of-store discounts and promotions will be redeemable when a purchase is made either online or in the physical store.

Technical effects and benefits include the development of highly informative purchasing preference profiles for repeat customers through the use of decision coupons that require the customer to make an informative choice in order to utilize selected promotional options. This allows targeted advertisements including promotional information, discounts and coupons to be tailored for individual customers based on their purchasing preference profiles. Voluntary customer participation and opt-in features allow the store to utilize inexpensive electronic advertising and limit its targeted advertising to customers who expect to receive the promotions, which increases customer acceptance and participation in the programs. Providing customers with targeted advertisements tailored specifically to their shopping preferences produces a personalized shopping experience that they receive only at the host store. Leveraging the customer loyalty program to include automatic coupon crediting at checkout and in-store targeted advertising further improves the convenience and effectiveness of the program.

In-store targeted promotions can be particularly effective for those customers who are interested in receiving this type of communication while shopping and therefore opt-in to the program in order to receive the program benefits. Customers who download the mobile app can receive the program benefits through their own mobile devices without requiring any additional hardware or software to participate. Other customers can participate through temporary use of mobile devices provided by the store, such as handheld devices limited to in-store access and tablet computers attached to shopping carts.

Figure 1:
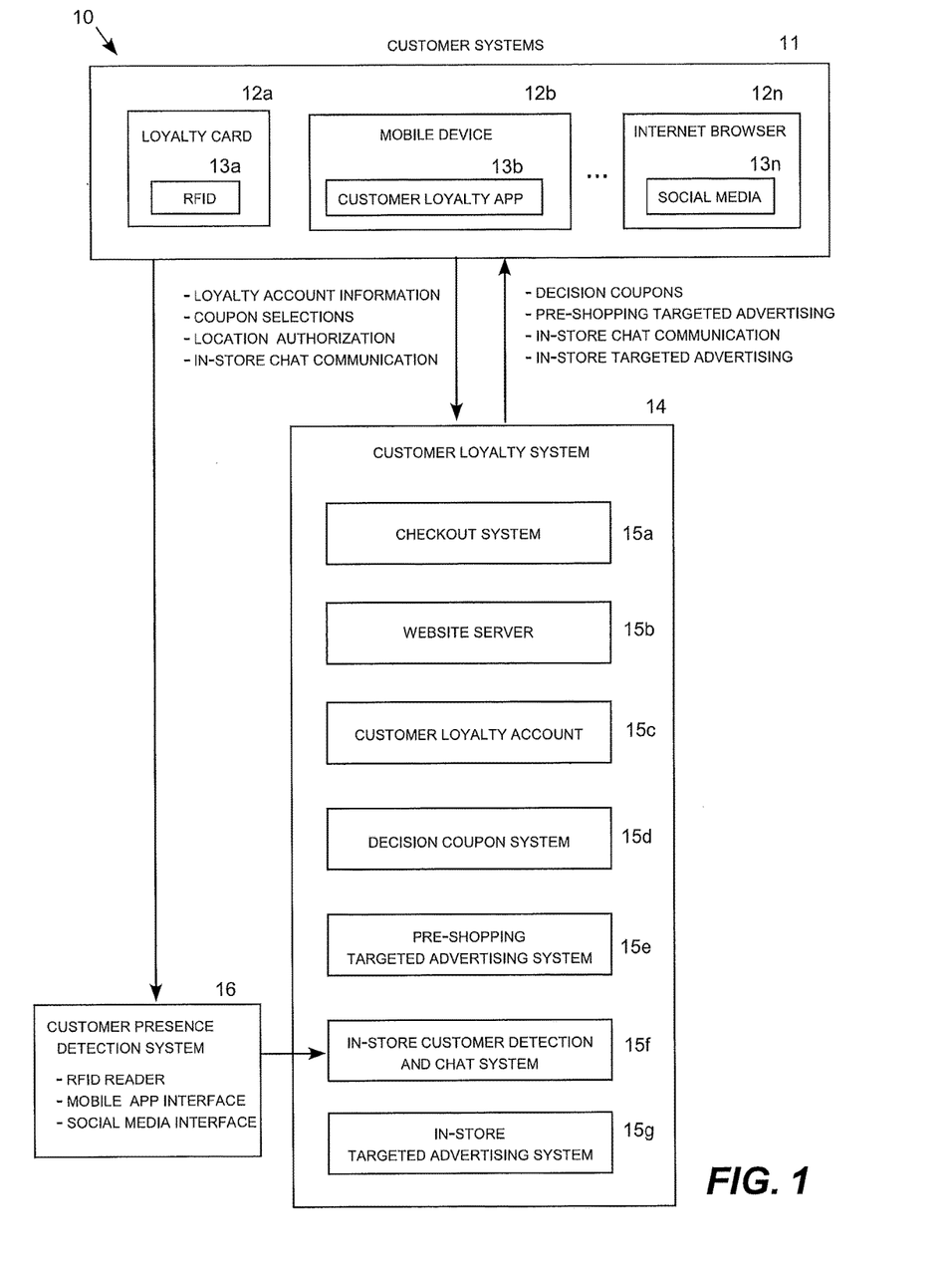
FIG. 1 depicts a targeted advertising system using customer purchasing preference profiles based on coupon choices in accordance with an embodiment.

Turning now to FIG. 1, a targeted advertising system 10 for a brick-and-mortar retail store includes customer systems 11 in the possession of customers and a customer loyalty system 14, which is typically operated by the store or an agent of the store. The customer systems 11 include a range of mobile devices 12a-n that customers may utilize to interact with the customer loyalty system 14. To allow a user to participate in an in-store targeted advertising program, which is an optional feature of the customer loyalty program, each customer system shown in this example includes a mechanism for detecting or reporting the customer's presence in the host store. Illustrative examples include a customer loyalty card 12a that includes an RFID tag 13a that is read as the card passes through an access point, such as a door of the store. In other cases cards with magnetic stripes, bar codes, QR codes, NGF tags or other identification tags may be present on the loyalty card. A mobile device, such as the customer's smartphone or tablet computer 12b running a customer loyalty app 13b is another example. For this alternative, the customer's mobile device has a location determination function that could use GPS or wireless signal based location detection function, which the mobile app 13b utilizes to notify the store when the mobile telephone comes onto the store premises. Other customers may use an Internet browser 12n with a social media location tracking feature 13n to notify the store when a location tracking device carried by the customer, such as a mobile telephone or tablet computer with GPS functionality, comes onto the store premises. In yet other cases, the customer may manually indicate their presence in the store. Other means of detection such as the presence of the customer's vehicle in the parking lot may also be used to learn that the customer is on her way to the store.

Additional examples include a loyalty card scanner used when a customer arrives at the store and a mobile telephone antenna that detects autonomous registration signals transmitted by a customer's telephone. For customers who do not have smartphones or tablets, the store may provide mobile units for customers to user while shopping in the store, such as a handheld unit limited to in-store use or tablet computers attached to shopping cart baskets. These systems are merely illustrative and any other mechanism for detecting a customer's presence in the store and conducting in-store communications with the customer while shopping may be utilized.

The functionality of the customer loyalty system 14 is largely indifferent to the type computing devices or network architecture used to implement the functionality. In one particular embodiment, the customer loyalty system may be a desktop or laptop computer running on a server and providing access to the customer systems 11 over a network, such as the Internet. The customer systems 11 may be a smartphones utilizing a mobile app to access the customer loyalty system through a wireless network connection. As another example, the customer systems 11 may include a tablet or other type of computer mounted to a shopping cart that a customer utilizes while shopping. It will be appreciated that any other computer environment allowing a large number of mobile devices used by customers to communicate with a centralized customer loyalty system may be used to realize embodiments of the invention.

The customer loyalty system 14 includes or interfaces with the store checkout system 15a, which is configured to automatically check coupon expiration dates and credit the customer with the selected promotions for valid decision coupons at checkout time. The customer loyalty system also includes or interfaces with the store website 15b, which may be one of the main ways that the store publishes decision coupons, receives coupon selections, and delivers targeted advertising to its customers. As an opt-in feature, the store may also "push" decision coupons to the customers, for example through text messages and through the customer loyalty app 13b running on the customer's computing device.

The customer loyalty system 14 also includes a customer loyalty account 15c for each participating customer. The customer loyalty account is a familiar element of the retail shopping experience typically used for accumulating points or other rewards based on purchases made at the store or chain. The present disclosure expands on this functionality by associating coupons with a participant's customer loyalty account, which are automatically checked for expiration and valid coupons are credited at checkout to eliminate the need for paper coupons. The customer loyalty account is further expanded to include a customer purchasing preference profile informed by selections that the customers makes to decision coupons. The customer loyalty account may also record the customer's purchase history, coupon redemption history, advertisement access history (e.g., click on, click through, and download history). The customer loyalty account also keeps track of the user's opt-in feature status, such as mobile app download status, authorization to send the customer "push" advertisements and coupons, authorization to detect the customer's presence in the store and send the customer in-store advertisements and coupons, authorization to share the customer's preference profile with program affiliates (e.g., product manufacturers and vendors), and so forth. The customer may have the ability to change the status of these authorizations globally and on an individual advertiser basis. For example, the customer may access and edit its status for various program features through the store website, the mobile app running on the customer's system, a mobile device provided to the customer for in-store use, or any other suitable technique.

The customer loyalty system 14 also includes a decision coupon system 15d, which manages decision coupon used to create or augment customer purchasing preference profiles. As noted above, the decision coupon may be transmitted to customers in a variety of ways subject to authorization setting controlled by the customer. In addition, the decision coupon system may be configured to implement a decision tree structure that adjust the decision coupons provided to a particular customer based on the customer's previous coupon selections, coupon utilization, and product purchasing history. For example, once it has been determined that the customer favors store brands over the name brands for a first type of product, future coupons may further investigate other types of products for which the customer prefers the store brands over name brands. As another example, once it has been determined that the customer favors organic over the non-organic options for a first type of product, future coupons may further investigate the other types of products for which the customer prefers the organic over the non-organic option. Customers may be encouraged to participate in the decision coupon process to obtain more desirable targeting advertising, discount and coupon offering and other incentives, such as reward points conferred for system participation.

The customer loyalty system 14 also includes a pre-shopping targeted advertising system 15e, which provides targeted advertising to a customer based at least in part on the purchasing preference profile. For example, the targeted advertising may include promotional information, product discounts, and coupons tailored to the customer based at least in part on their customer's purchasing preference profile. The targeted advertising system may take other factors into consideration, such as the customer's purchasing history, the customer's coupon redemption history, and discounts and coupons available from product manufacturers and vendors. For this particular feature, the targeted advertising is made available through resources that the customer may access before they begin shopping, such as availability on the store website. This may include a link or tab in the customer's loyalty account, pre-shopping text notification, email operations, and other suitable techniques.

The customer loyalty system 14 also includes an in-store customer detection and chat system 15f, which is typically activated as an opt-in feature. This feature may be, but need not necessarily be, facilitated by downloading the customer loyalty app 13b, which runs on the customer's mobile device 12b. This feature works in concert with a customer presence notification system 16 that detects when the customer is present in the store, such as an RFID reader that detects the RFID tag 13a on the customer's loyalty card 12a, a mobile device registration system that receives notification from the mobile app 13b running on the customer's mobile device 12b, or the customer's social media 13n with GPS tracking, shown in FIG. 1. An in-store mobile device, such as a mobile device checked out by a customer or a tablet securely mounted on a shopping cart, may also be utilized to implement this feature.

The interactive chat system 15f inquires as to the customer's shopping intention for the purpose of targeted advertising. For example, the chat system may first inquire whether the customer is interested in receiving in-store promotions. If so, it may present the customer with a menu with check boxes that the customer completes to indicate the types of items that the customer intends to purchase during this particular visit to the store. The customer may also specify whether this is a short visit for a few specific items or a major shopping trip covering a full range items. The customer may also activate a general advertisement feature, which authorizes all of the store's "weekly specials" and coupons to be delivered to the mobile device used by the customer during the shopping visit. A few well designed selections from the customer will ordinarily allow the chat system to hone in on a specific set of targeted advertisements for the customer.

The customer loyalty system 14 also includes an in-store targeted advertising system 15f, which provides promotional information, discounts and coupons to the customer while they are in the store shopping. The targeted advertising may provide highly specific offerings that the customer has authorized to avoid annoying the customer with a large number of unwanted offering. The customer's chat responses discussed above, purchasing preference profile, coupon selection history, coupon redemption history, purchasing history, and manufacturer or vendor offering are utilized to provide highly targeted advertisements to the particular customer. Precise in-store location detection, such as RFID readers in store sections, can provide tailored offerings to the customer's location within the store. This allows targeted advertisements and coupons to be delivered to the mobile device used by the customer on a department-by-department basis as the customer's presence is detected in the store's various departments. For example, produce coupons can be offered while the customer is located in the produce section, bread coupons can be offered while the customer is located in the bread section, juice coupons can be offered while the customer is located in the juice section, and so forth.

Promotions may also be tailored to a specific user based on the customer's shopping loyalty, such as frequency or level of purchases made at the store. For example, frequent shopper reward levels may be defined with corresponding rewards, such as product discounts, general point rewards, enhanced fuel points, or frequent flier points with an affiliated partner. As a result, each customer may influence the targeted advertisements they received through participating in the program over time. Targeted advertisements including customer loyalty-based offerings may also follow the customer to other store locations in the same chain (or stores operated by program affiliates) to encourage customer loyalty when the customer is shopping away from their usual store. This encourages customers to seek out the chain or affiliated store when traveling in order to receive the same program benefits when shopping away from their usual store.

Figure 2:
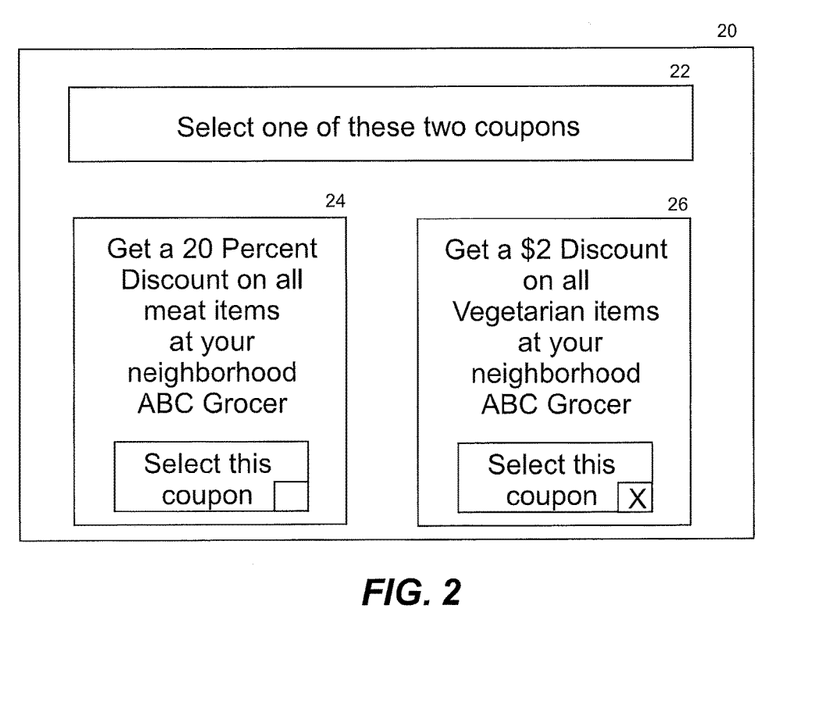
FIG. 2 depicts a first example of a decision coupon in accordance with an embodiment.
Figure 3:
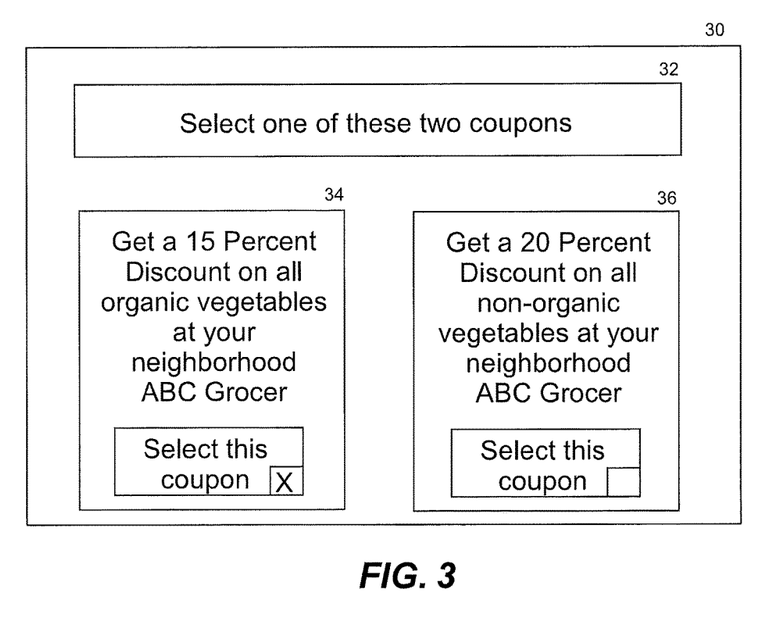
FIG. 3 depicts a second example of a decision coupon in accordance with an embodiment.
Figure 4:
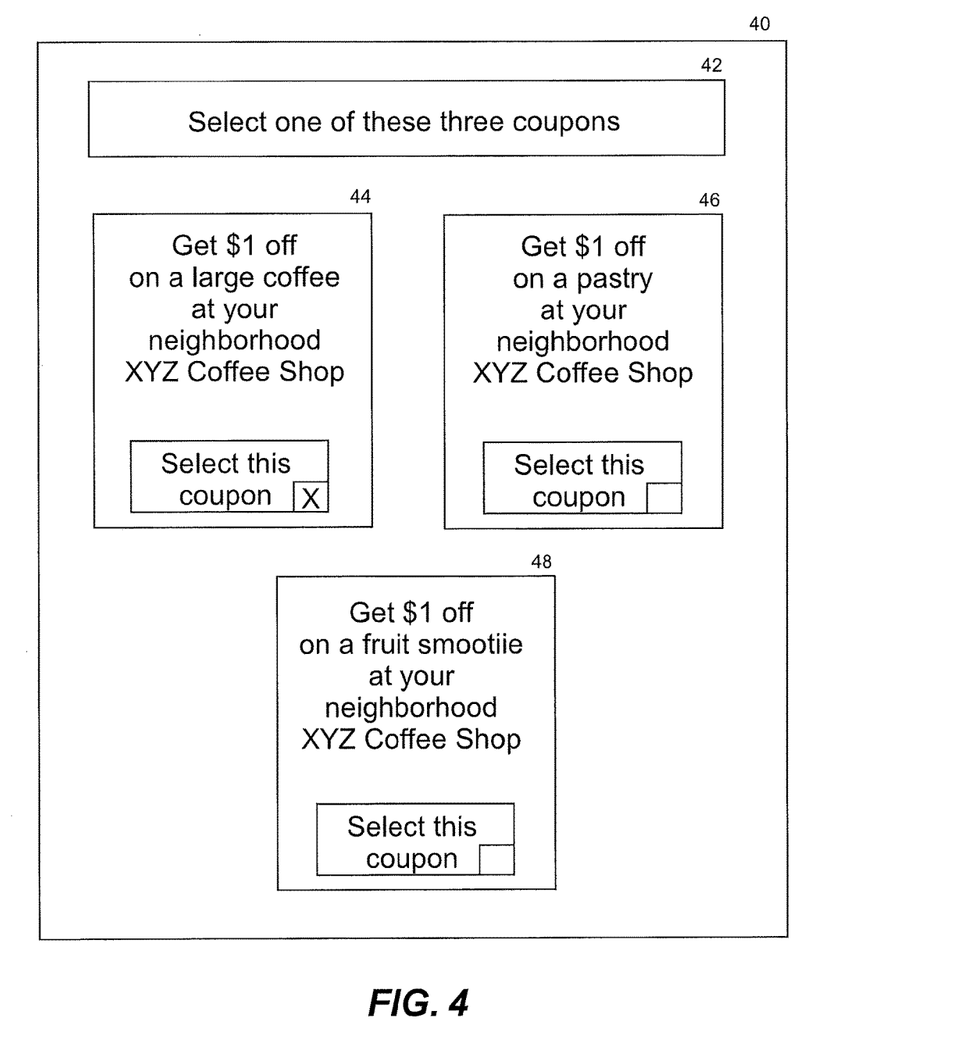
FIG. 4 depicts a third example of a decision coupon in accordance with an embodiment.

FIGS. 2-4 illustrate a series related decision coupons used to build a customer purchasing preference profile. FIG. 2 depicts a first example of a decision coupon 20 that includes an instruction 22 to select between two available promotions 24 and 26. A first promotion 24 offers a discount on meat items at the host store, while a second promotion 26 offers a discount on vegetarian items at the host store. For this first decision coupon, the user has selected the second promotion 26 directed to vegetarian items. Based on this selection, the customer is presented with another decision coupon to further define their preference regarding vegetarian items. To illustrate this functionality, FIG. 3 depicts a second decision coupon 30 prompting the user to select between an organic vegetable coupon 34 and a non-organic coupon 36. In this second decision, the user has selected the first coupon 34 directed to organic items. As another follow-up, FIG. 4 depicts a third decision coupon 40 that prompts the customer to select between three options based on the customer's preference for organic vegetables. A first option 44 offers a discount on a coffee drink at an affiliated shop, a second option 46 offers a discount on a pastry at the affiliated shop, and a third option 48 offers a discount in a fruit smoothie at the affiliated shop.

It will be appreciated that a customer who selected the meat item coupon 24 in the first offering shown in FIG. 2 may have received a meat-related decision coupon as the next offering. For example, this customer may receive a follow-up decision coupon asking the customer to choose between a chicken coupon and a beef coupon. If the customer selects the chicken coupon, the next decision coupon may ask the customer to select between fresh and frozen chicken, and so forth.

In general the system identifies gaps in the customer preference profile and tries to offer coupons whose selection or rejection will shed some insight on the identified gap. For instance if a shopper is not buying toilet paper at a store, the store might try to see if price is an issue that is holding up the customer. If the customer rejects deep discounts on toilet paper, the retailer may reach the conclusion that the customer purchases toilet elsewhere. Gaps in profiles are detected by looking at the customer's transactions, comparing them with a typical customer with similar characteristics. Other gaps that may be filled include brand loyalty, brand sensitivity, proclivity for new products, aspiration level for premium products, sensitivity to packaging, sustainable products, affinity for healthful products, ability to purchase and store larger quantities of goods in the house, ability/flexibility to change typical time of shopping, ability to use products with short expiration windows, etc.

Figure 5:
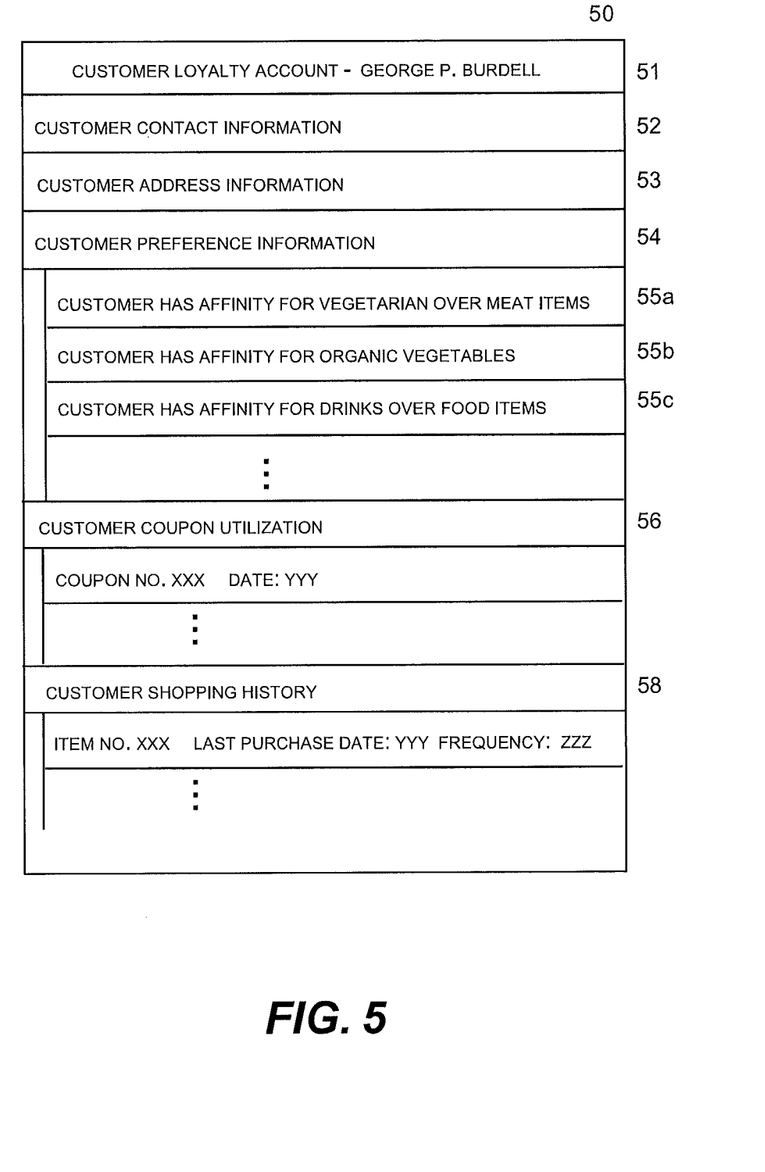
FIG. 5 depicts a customer loyalty account including a customer purchasing preference profile based on coupon choices in accordance with an embodiment.

FIG. 5 depicts a customer loyalty account 50 including a customer preference profile based on coupon choices. The customer loyalty account includes an account owner entry 51, an owner contact information entry 52, an owner address entry 53, and a customer preference category 54, which includes the customer's decision coupon choices or indications of the customer's purchasing preference characteristics derived from those selections 55a-55c. The customer loyalty account may also include the customer's coupon redemption history 56 and purchasing history 58. It will be appreciated that these items are merely illustrative, all of these specific items do not necessarily have to be tracked, and a wide range of other information may be tracked. A few additional examples for illustration purposes include the customer's opt-in authorizations (e.g., authorization for push advertising, authorization for in-store advertising, authorization for preference profile sharing, etc.), advertisement click-on and click-through history, franchise locations where the user has shopped, affiliate members (e.g. frequent flier account for receipt of shopping reward points, fuel vendor affiliate for receipt of shopping reward points, etc.), family members associated with the customer's account entitled to share in the customer's shopping benefits, and so forth.

Figure 6:
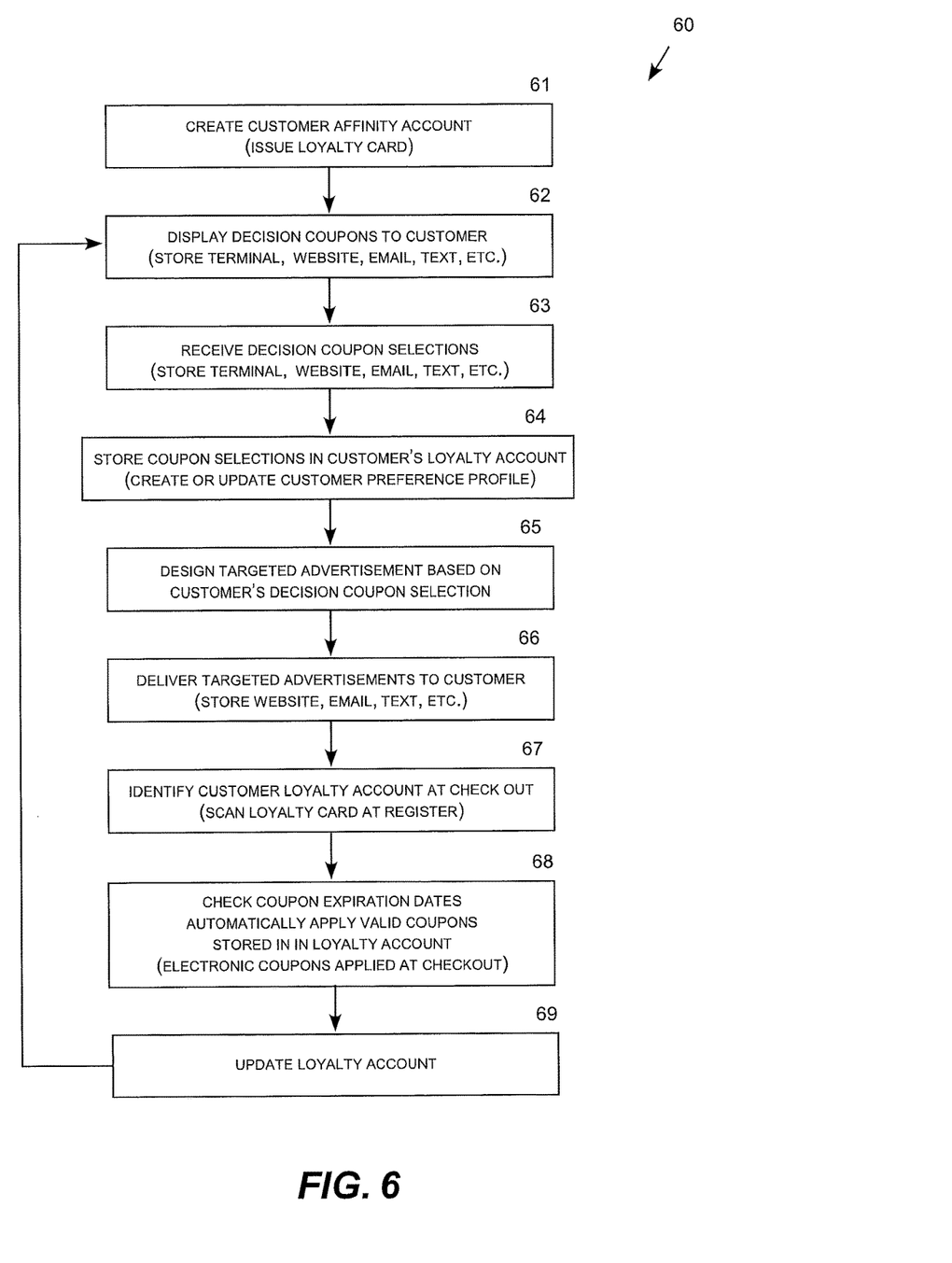
FIG. 6 depicts a logic flow diagram for creating a customer purchasing preference profile based on coupon choices in accordance with an embodiment.

FIG. 6 depicts a logic flow diagram 60 for creating a customer preference profile based on coupon choices, which is implemented largely by the customer loyalty system 14 in FIG. 1. In block 61, the customer loyalty system creates the customer's loyalty account typically in association with issuing the customer a loyalty card and/or downloading of the mobile app to a customer device. In block 62, the customer loyalty system displays a representative decision coupon to the customer, for example on a store terminal, store website, email to the customer, text message to the customer, or other technique. In block 63, the customer loyalty system receives a coupon selection from the customer. In block 64, the customer loyalty system stores the selected coupon in the customer's loyalty account and creates or updates the customer's preference profile to reflect the coupon selection. In block 65, the customer loyalty system designs a targeted advertisement for the customer based on the customer's coupon selection. In block 66, customer loyalty system delivers the targeted advertisement to the customer, for example by placing an ad or a link to the ad in the customer's loyalty account, email, text message, or other suitable communication technique. The customer's authorized or preferred contact method indicated in the customer's loyalty account or mobile app is typically used to deliver targeted advertisement to the customer.

In block 67, the customer's loyalty account is identified at checkout time, for example by scanning the customer's loyalty card or communication with the customer's mobile app downloaded to enable participation in the program. In block 68, the customer loyalty system checks the coupon expiration dates applies a valid coupon selected by the coupon stored in the customer's loyalty account to the customer's qualifying purchase (i.e., an unexpired coupon selected by the customer is automatically applied to the item or type of item corresponding to the selected coupon) during the shopping checkout process, which eliminates the need for paper coupons. In block 69, the customer's loyalty account is updated to reflect use of the selected coupon.

Figure 7:
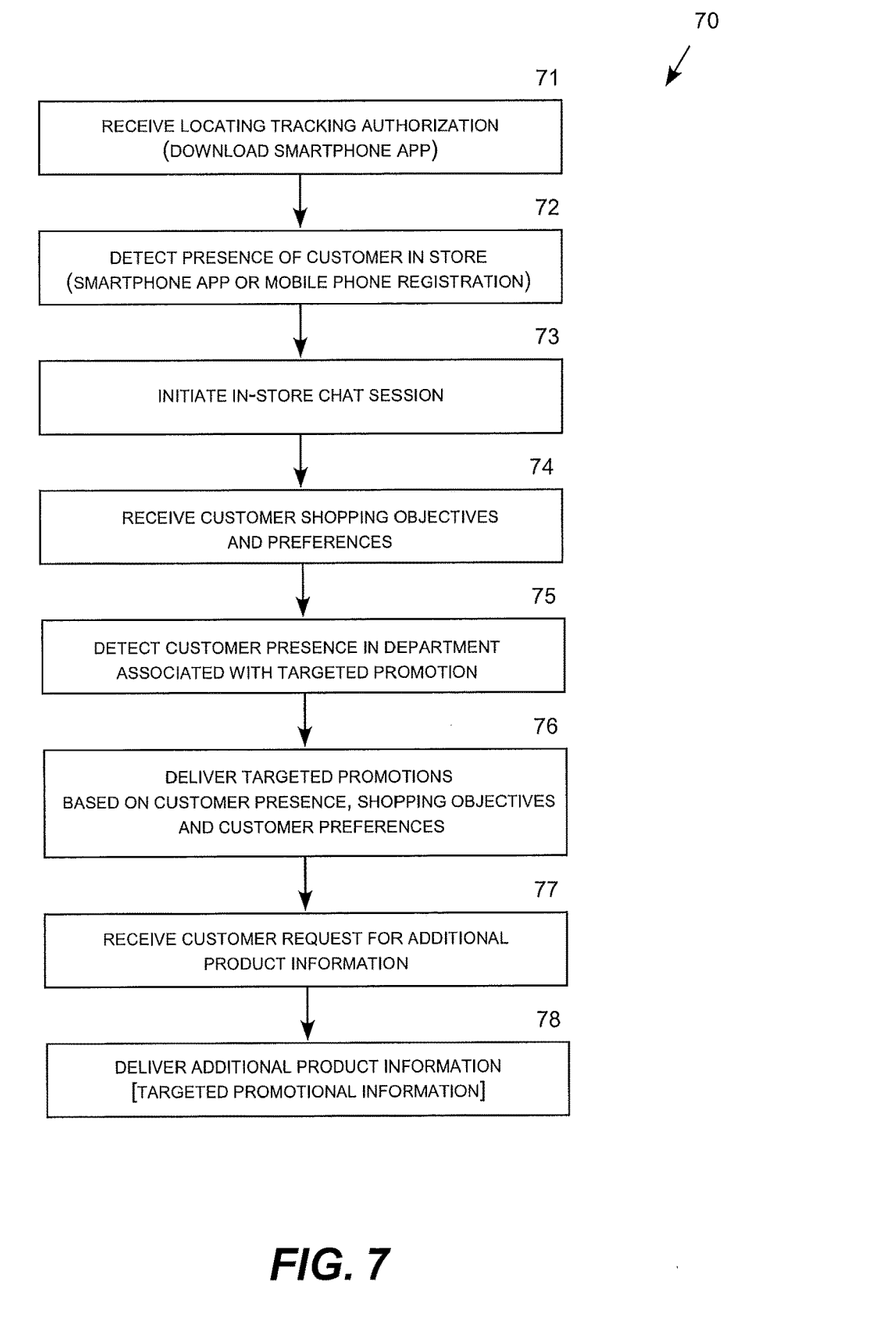
FIG. 7 depicts a logic flow diagram for targeted advertising in accordance with an embodiment.

The process described above need not involve in-store targeted advertising. To enable this option, FIG. 7 depicts a logic flow diagram 70 for in-store targeted advertising. In block 71, the customer loyalty system receives location tracking authorization from the customer, which may be received when the customer registers for a loyalty account or downloads the mobile app for use with the program. In block 72, the customer loyalty system detects the presence of the customer in the store, for example by detecting the presence of the customer's customer loyalty card or mobile device running the store's smartphone app, detecting autonomous registration of the customer's mobile phone in the store, or social media GPS tracking. Alternatively, the customer may check out a mobile device provided by the store for use while the customer is shopping in the store or activate a mobile device carried on a shopping cart.

In block 73, the customer loyalty system initiates an in-store chat exchange with the customer. In block 74, the customer loyalty system receives responses from the customer indicating whether the customer is interested in receiving in-store advertisement during the current shopping visit, the type of shopping visit, the types of products the customer intends to purchase, the type of in-store promotions the customer is interested in receiving, and so forth. As an option, in block 75 a local device in the store detects the customer's presence in a particular department in the store associated with a targeted promotion identified for the customer. For example, a customer who has indicated that they intend to purchase bread may be presented with a bread coupon when the customer enters the bread department. The customer's presence in the bread department may be determined by an RFID reader in the bread department detecting the RFID tag carried on the customer's loyalty card, or a wireless receiver detecting the mobile app running on the customer's smartphone or one of the store's mobile devices temporarily assigned to the customer. In block 76, the customer loyalty system delivers the targeted promotions to the customer. The promotions are usually limited to those that are consistent with the customer's shopping intentions and authorizations to avoid bombarding the customer with unwanted promotions.

As another option, the customer may opt-in to receiving promotions generally, in which case all or a subset of the store's available promotions and coupons (e.g., weekly specials and coupons) may be displayed on the customer's mobile device on department-by-department basis as the customer moves through the store (e.g., bread promotions displayed when the customer is located in the bread department, milk promotions displayed when the customer is located in the dairy department, etc.) It will be appreciated here that the promotions and coupons displayed to each customer may be selected or prioritized based on the customer's preference profile, coupon redemption history, shopping history, and shopping intentions as indicated at the start of the shopping visit. RFID readers and wireless communication devices configured to detect the store's wireless app running on customer devices and the store's devices provided for temporary use (e.g., tablets attached to shopping carts) may be deployed throughout the store to increase the granularity of product information, promotional information and coupons, which may be tailored to individual customers.

As another option, the mobile device used by the customer may be configured to receive a request from a customer for additional information associated with individual products. For example, the mobile device, in some cases enabled by the store's mobile app running on the customer's mobile app, may be operative to read a barcode, QR code, RFID tag or other device located on the product or on the shelf associated with the product. In block 77, the mobile device used by the customer receives a customer request for additional information, for example by reading a barcode, QR code, RFID tag or other device located on the product or on the shelf associated with the product. In block 78, the device read by the mobile device and/or another server communicates additional product information, such as nutritional information, allergy information, product warnings, and so forth. At this point, the customer loyalty system may also provide targeted promotional information, indicate special pricing, or offer a coupon for the specific product scanned by the customer. As another option, the customer loyalty system may provide promotional information or offer coupons on similar items on sale. For example, a customer who often asks for information concerning gluten free products may receive additional information on gluten-free products on sale in the store. A frequent purchaser of gluten-free products may also receive coupons or discounts limited to frequent purchasers of gluten-free products (i.e., targeted promotions specifically tailored to the customer's purchasing preference profile). This type of personalized shopping experience can be highly effective in attracting and retaining customer with dietary restrictions and other types of purchasing preferences.

Figure 8:
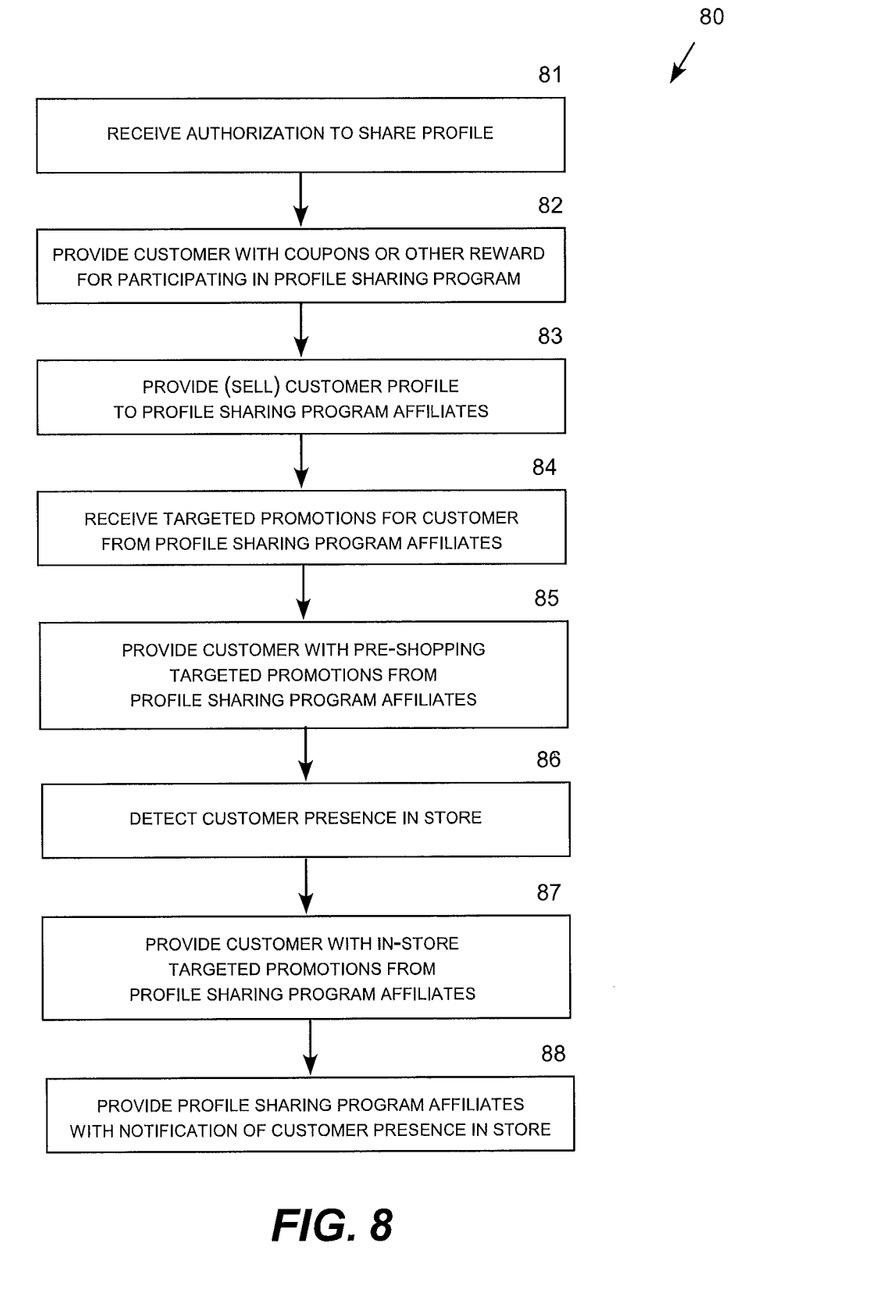
FIG. 8 depicts a logic flow diagram for in-store targeted advertising in accordance with an embodiment.

FIG. 8 depicts a logic flow 80 diagram for in-store targeted advertising in accordance with an embodiment. In step 81, the customer loyalty system receives authorization from the customer to share the customer's preference profile. For example, the store's mobile app may contain an opt-in selection item for the feature. In step 82, the customer loyalty system may provide the customer with coupons, points or another reward for opting in for this feature. In block 83, the customer loyalty system provides (and may sell) access to the customer's preference profile to program affiliates, such as manufacturers and vendors with products carried in the host store (or others consistent with the customer's authorization). In block 84, the customer loyalty system receives targeted promotions from a program affiliate, which may be specifically directed to the customer by the program affiliate. In block 84, the customer loyalty system includes the promotions from the program affiliate in the pre-shopping promotions offered to the customer, for example by including information about the promotion or a link to the promotion in the customer's loyalty account. For example, the customer may access these promotion on the store's website or via the store's mobile app running on the customer's mobile device. As another opt-in feature, in block 86 the store detects the presence of the customer in the store and in block 87 includes the promotions from the program affiliate in those offered to the customer as in-store promotions. As another opt-in feature, in block 88 the store notifies the program affiliate of the customer's presence in the store to enable the program affiliate to send promotional information directly to the customer's mobile device.

Figure 9:
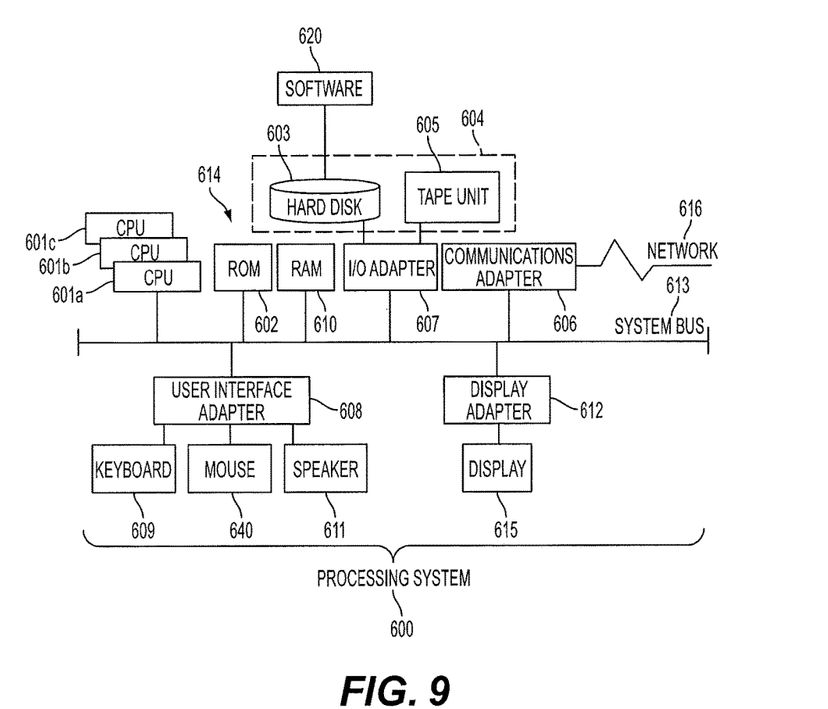
FIG. 9 depicts a processing system suitable for implementing a targeted advertising system in accordance with an embodiment.

Referring now to FIG. 9, there is shown an embodiment of a processing system 600 for implementing the teachings herein. In this embodiment, the processing system 600 has one or more central processing units (processors) 601a, 601b, 601c, etc. (collectively or generically referred to as processor(s) 601). Processors 601, also referred to as processing circuits, are coupled to system memory 614 and various other components via a system bus 613. Read only memory (ROM) 602 is coupled to system bus 613 and may include a basic input/output system (BIOS), which controls certain basic functions of the processing system 600. The system memory 614 can include ROM 602 and random access memory (RAM) 610, which is read-write memory coupled to system bus 613 for use by processors 601.

FIG. 9 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage drive 605 are collectively referred to herein as mass storage 604. Software 620 for execution on processing system 600 may be stored in mass storage 604. The mass storage 604 is an example of a tangible storage medium readable by the processors 601, where the software 620 is stored as instructions for execution by the processors 601 to perform a method, such as the process flow of FIGS. 6-8. Network adapter 606 interconnects system bus 613 with an outside network 616 enabling processing system 600 to communicate with other such systems. A screen (e.g., a display monitor) 615 is connected to system bus 613 by display adapter 612, which may include a graphics controller to improve the performance of graphics intensive applications and a video controller. In one embodiment, adapters 607, 606, and 612 may be connected to one or more I/O buses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 640, and speaker 611 can be interconnected to system bus 613 via user interface adapter 608, which may include, for example, a Super I/O chip integrating multiple device adapters into a single integrated circuit.

Thus, as configured in FIG. 9, processing system 600 includes processing capability in the form of processors 601, and, storage capability including system memory 614 and mass storage 604, input means such as keyboard 609 and mouse 640, and output capability including speaker 611 and display 615. In one embodiment, a portion of system memory 614 and mass storage 604 collectively store an operating system such as the AIX® operating system from IBM Corporation to coordinate the functions of the various components shown in FIG. 9.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for creating or improving customer purchasing profiles, comprising:

providing, via a mobile device display through a mobile app installed on a mobile device associated with a customer, a first decision coupon to the customer with two or more promotional options directed to related items selected to ascertain a purchasing preference associated with the related items through selection of one of the promotional options, wherein the selection of one of the promotional options eliminates each unselected two or more promotional options, and wherein the selection of one of the promotional options indicates a preference of a first product category of the one of the promotional options over one or more product categories of the unselected two or more promotional options, and wherein the mobile app causing the mobile device to display the first decision coupon;

receiving, via the mobile app, a first selection of one of the promotional options;

eliminating, from a display of the mobile device by the mobile app, each of the unselected two or more promotional options;

storing an indication of the first selection in a customer purchasing preference profile;

using the indication of the first selection to update an affinity for a product or product category for the customer within the customer purchasing preference profile;

responsive to the first selection, providing, via the mobile app, a second decision coupon to the customer with two or more promotional options based on the first selection of one of the promotional options, wherein the two or more promotional options are related to the one of the promotional options;

receiving, via the mobile app, a second selection of a second promotional option of the two or more promotional options based on the first selection of one of the promotional options;

storing an indication of the second selection in a customer purchasing preference profile; and providing, via the mobile app, a text message notification of a targeted advertisement, wherein the targeted advertisement is based on the affinity for the product or product category for the customer.

2. The method of claim 1, further comprising delivering the targeted advertisement in response to receiving a notification that the customer is located in a store premises associated with the customer purchasing preference profile.

3. The method of claim 1, further comprising delivering the targeted advertisement in response to receiving a notification that the customer is located in a particular location within a store premises associated with the decision coupon.

4. The method of claim 1, further comprising delivering the targeted advertisement in further response to receiving an opt-in notification that the customer has consented to receiving the targeted advertisement.

* * * * *